United States Patent [19]
Murakawa et al.

[11] Patent Number: 5,469,816
[45] Date of Patent: Nov. 28, 1995

[54] CONTROL MECHANISM FOR AN ELECTRIC GENERATOR MOTOR IN AN INTERNAL COMBUSTION ENGINE

[75] Inventors: Takaji Murakawa, Kariya; Toyoji Yagi, Anjo; Hiroshi Tashiro, Nagoya, all of Japan

[73] Assignee: Nippondenso Co., Ltd., Kariya, Japan

[21] Appl. No.: 299,278

[22] Filed: Sep. 1, 1994

[30] Foreign Application Priority Data

Sep. 2, 1993 [JP] Japan .................................. 5-218701

[51] Int. Cl.$^6$ ................................................ F02B 63/00
[52] U.S. Cl. .................... 123/2; 180/65.4; 290/50
[58] Field of Search ................ 123/2; 180/65.2, 180/65.4, 165; 290/45, 50, 51; 318/139

[56] References Cited

U.S. PATENT DOCUMENTS

| | | | |
|---|---|---|---|
| 4,313,080 | 1/1982 | Park | 180/65.2 |
| 5,172,006 | 12/1992 | Suzuki et al. | 290/45 |
| 5,346,031 | 9/1994 | Gardner | 180/65.2 |

FOREIGN PATENT DOCUMENTS

| | | |
|---|---|---|
| 61-38161 | 2/1986 | Japan . |
| 3-36981 | 2/1991 | Japan . |
| 4109033 | 4/1992 | Japan . |
| 4330332 | 11/1992 | Japan . |

*Primary Examiner*—Noah P. Kamen
*Attorney, Agent, or Firm*—Cushman, Darby & Cushman

[57] ABSTRACT

A control mechanism for an electric generator motor which can prevent excessive charging and insufficient capacity of an electrical power storage device includes a controller controlling operation of the electric generator motor when a total of restorable electrical power calculated on the basis of vehicle state and a present capacity of the electrical storage device is smaller than a specified reference capacity. The control mechanism effects a motor operation, i.e., application of torque, of the generator motor within a range in which the capacity of the electrical storage device does not fall below a specified minimum charge level required for driving vehicle auxiliary devices. The control mechanism effects motor operation of the electric generator motor with continuously changing restorable electrical power which has a positive correlation with an effective amount of depression of a brake pedal. The control device effects application of torque using the motor generator when a total of restorable electrical power is larger than a specified minimum capacity value.

7 Claims, 16 Drawing Sheets

CONTROL MECHANISM FOR AN ELECTRIC GENERATOR MOTOR IN AN INTERNAL COMBUSTION ENGINE

BACKGROUND OF THE INVENTION

1. Field of the Invention

The present invention relates to a control mechanism for an electric generator motor which is driven by an internal combustion engine of a vehicle and/or electric power from a storage battery.

2. Description of Related Art

Japanese Patent Application Laid-Open No. 61-38161 discloses a control mechanism for an electric generator motor in an internal combustion engine which applies torque to the internal combustion engine during engine starting and acceleration and restores electrical power to the battery during vehicle braking by exchanging torque with the internal combustion engine.

However, because the above-described mechanism applies torque and restores electrical power irrespective of the vehicle running speed or the present capacity of the electrical storage battery, insufficient or excessive charging of the storage battery may occur.

Furthermore, at times when restoration of electric power is possible, it is preferable from the standpoint of fuel consumption that such power restoration be performed to the greatest extent possible, but, if the present capacity of the electrical storage battery is too high, adequate restoration power cannot be provided.

SUMMARY OF THE INVENTION

In light of the foregoing problems, it is a first object of this invention to provide a control mechanism for an electrical generator motor in an internal combustion engine which can perform, without degrading fuel consumption, sufficient restoration of electrical power while suppressing excessive charging of an electrical storage device such as a storage battery.

Furthermore, it is a second object of this invention to enable execution of a torque-applying mechanism which can suppress insufficient charging of the electrical storage device.

A control mechanism according to this invention causes an electrical generator motor to operate as a generator and restore electrical power to the battery during braking of a vehicle, and also causes the electrical generator motor to operate as a motor and apply torque to the internal combustion engine responsive to commands from a driver.

According to this invention, when the total or sum of the amount of restorable electrical power calculated on the basis of the state of the vehicle and the present capacity of the electrical storage means is smaller than a specified reference capacity, a vehicle braking operation causes the electrical generator motor to operate as a generator. In this way, the capacity of the electrical storage device does not become excessive in comparison with an optimal reference capacity range during vehicle braking, and the application of torque and restoration of electrical power can be accomplished while preventing excessive charging of the electrical storage device.

Moreover, according to this invention, the electrical storage device causes motor operation of the electrical generator motor— i.e., the application of torque—within a range whereby the capacity of the electrical storage device does not fall below a specified minimum capacity required for electrically driving vehicle auxiliary electrical devices. In this way, even if the capacity of the electrical storage device (i.e., the amount of electrical power storage) falls because of application of torque to the engine by the generator motor, the battery will not be drained to the extent that it is unable to drive the auxiliary devices later—for example, when the engine is stopped.

Furthermore, according to this invention, the electric generator motor restores electric power in a manner that positively correlates with changes in the effective amount of brake pedal depression, when electric power restoring is determined to be possible. By this, when the range of effective amount of depression of the brake pedal is changed, a smooth braking feeling can be obtained in the range of effective amount of depression of the brake pedal; thereby preventing an abrupt change in the magnitude of restored electrical power and braking shock.

Still further, according to this invention, when the total or sum of the amount of restorable electrical power calculated on the basis of the running state of the vehicle and the present capacity of the electrical storage means is larger than a specified minimum capacity, torque application is performed. In this way, the battery is not drained to an unacceptable level.

DETAILED DESCRIPTION OF THE PREFERRED EMBODIMENTS

The present invention will be described in detail below with reference to the accompanying drawings.

Figure 1:
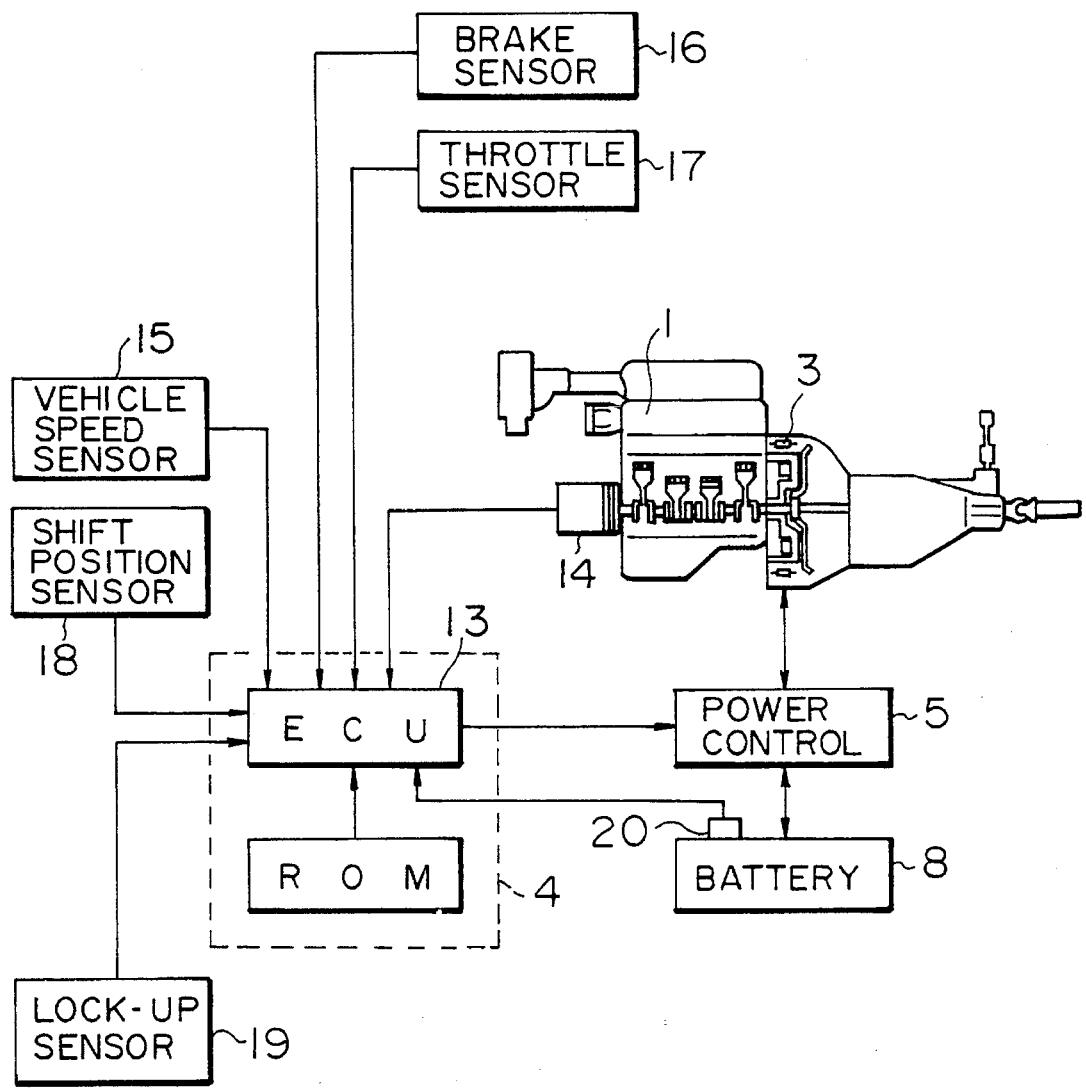
FIG. 1 is a block diagram showing the overall structure of a control mechanism for an electrical generator motor in a vehicle according to this invention.

FIG. 1 depicts an overall control mechanism for an electrical generator motor in an internal combustion engine according to the present invention.

AI electric generator motor 3 is linked to the crank-shaft of an internal combustion engine 1 of a vehicle to allow torque exchange therebetween. In addition to the generator motor 3 which exchanges electrical power with an electrical storage device 8 (e.g., a battery), the mechanism includes an electrical power control unit 5 which can switch between the generator operation and the motor operation of the electrical generator motor 3, a crank angle sensor 14 which detects the angle of the crankshaft, a vehicle speed sensor 15 which detects the speed of the vehicle, a brake sensor 16 which detects a brake depression force, a throttle sensor 17 which detects a throttle opening, a shift position sensor 18 which detects the shift position of a speed-change gear of a transmission (not shown), a lockup sensor 19 which detects the presence or absence of lockup of a torque converter on the input side of the transmission, an electrical power sensor 20 which detects charge/discharge current and terminal voltage of the battery 8, and a controller 4 which controls the electrical power control unit 5 on the basis of the signals from these sensors 14 to 20 to thereby control the operation of the electric generator motor 3. The controller 4 comprises an electronic control unit 13 (ECU), which is a computer for internal combustion engine control, and a ROM which stores various data in map form.

Figure 2:
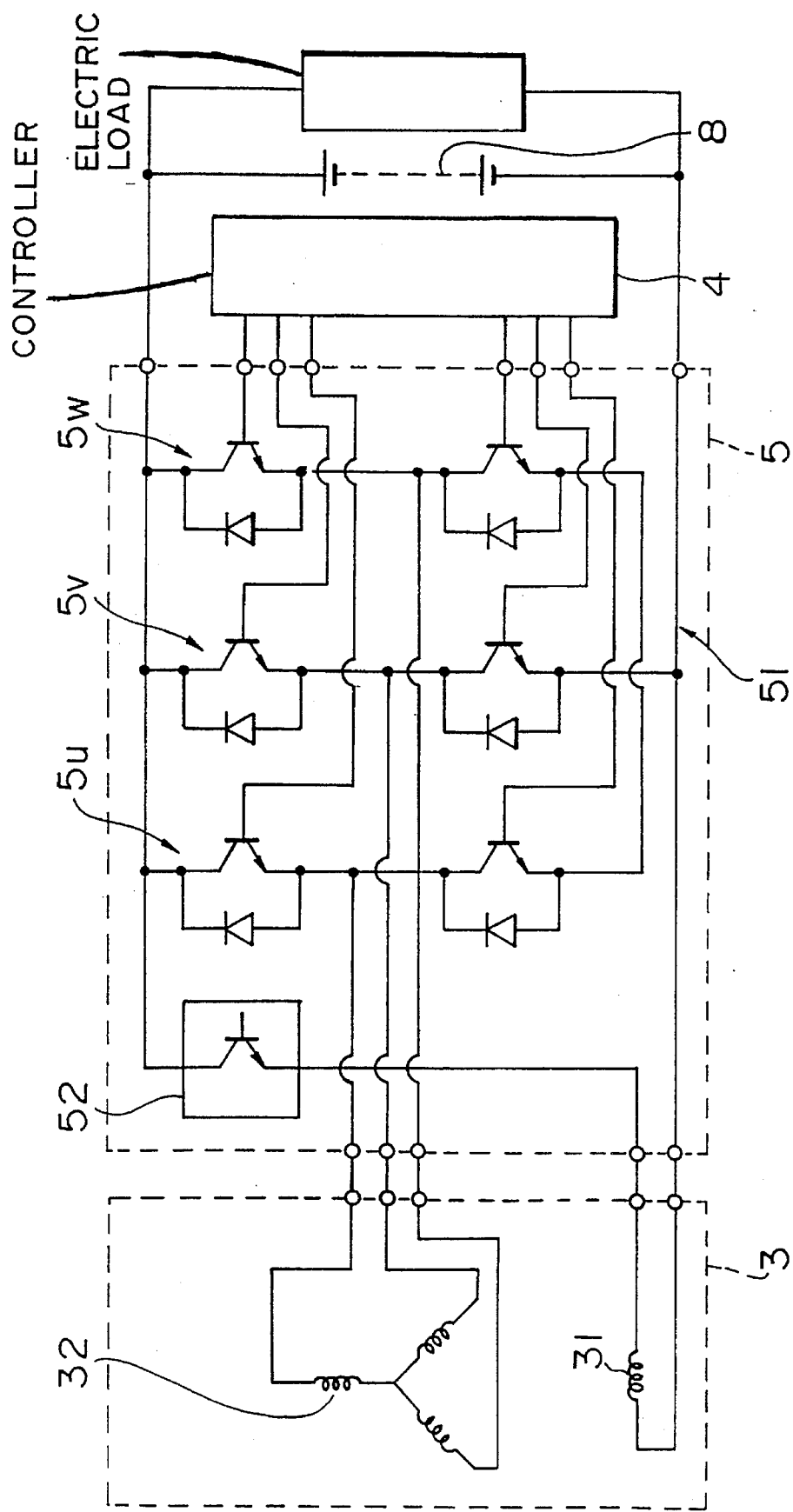
FIG. 2 is a schematic diagram of the power control unit of FIG. 1.

FIG. 2 is a schematic diagram of this mechanism, particularly of the power control unit 5.

The electrical generator motor 3 is a three-phase synchronous type motor, the rotor core (not shown) of which is wound with an excitation coil 31 and the stator coil (not shown) of which is wound with a star-connected three-phase armature coil 32.

The electrical power control unit 5 is composed of a three-phase inverter circuit 51 which controls switching of transistors on the basis of crank angle, and a transistor 52 for intermittent excitation current. The three phase inverter circuit 51 is composed of inverters 5u, 5v and 5w for each phase, each of which includes a pair of npn transistors (or IGBTs) connected in series. The two ends of the inverters 5u, 5v and 5w of each phase are connected to the two terminals of the battery 8, and each of the foregoing transistors (or IGBTs) of the three phase inverter circuit 51 is shunted by a diode. The outputs of the inverters 5u, 5v and 5w of each phase are connected to the output terminals of the three armature coil 32. One lead of the excitation coil 31 is connected to a negative or ground terminal of the battery 8, and the other lead is connected through the transistor 52 to the positive terminal of the battery.

Generator operation and motor operation are switched over by controlling the switching times of each transistor of the three phase inverter circuit 51 by means of instructions from the ECU 13 of the controller 4 shown in FIG. 1, and the duty ratio of the excitation current is controlled by intermittent switching of the transistor 52 for excitation current control. This technique is known and a description in greater detail will be omitted for brevity. In this way, the electrical generator motor 3 performs a generator operation and a motor operation to exchange torque with the internal combustion engine 1, or to exchange electrical power with the battery 8.

Figure 3:
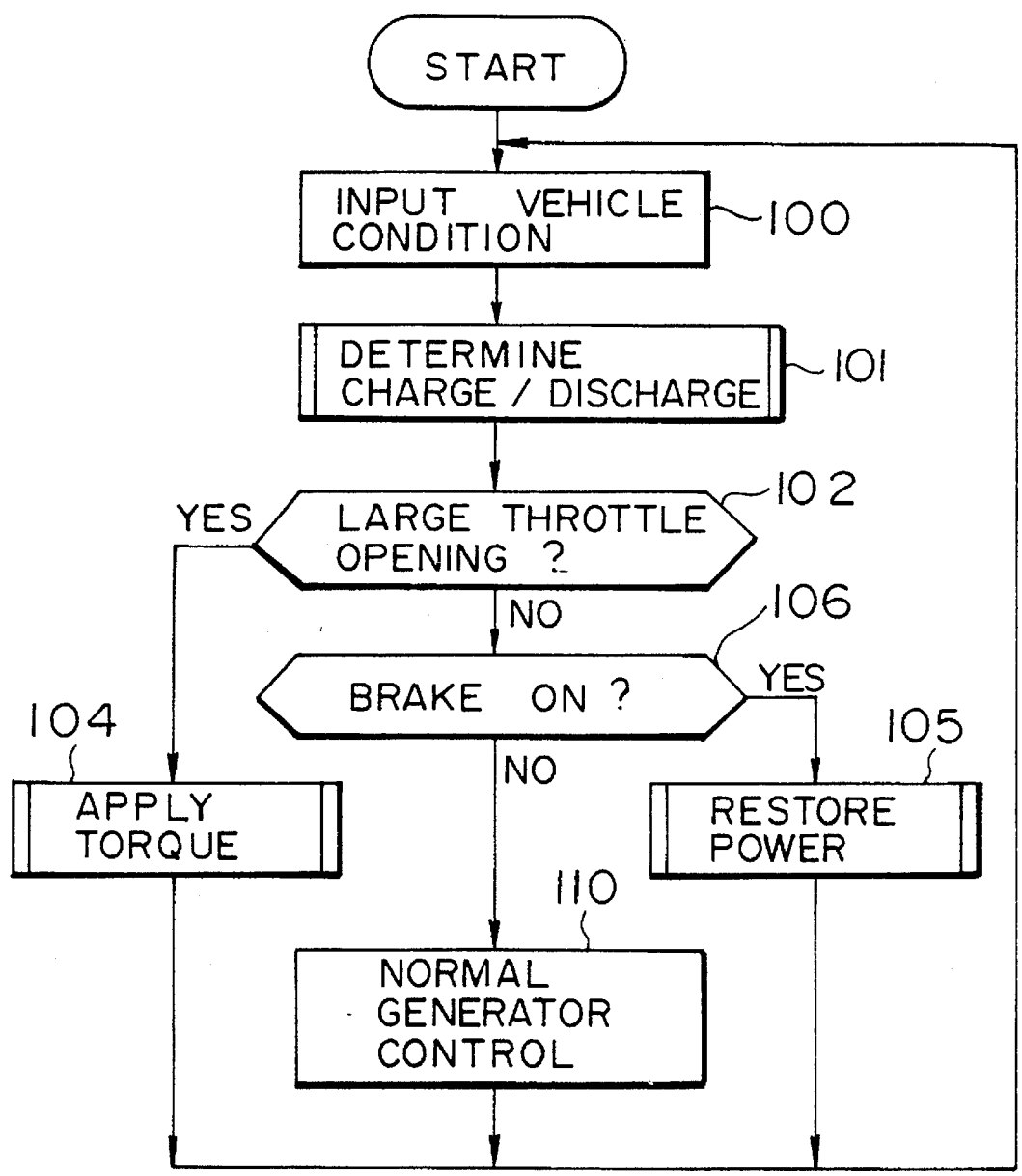
FIG. 3 is a flowchart showing the overall control operation according to a first embodiment of the control mechanism of FIG. 1.

Operation of the control mechanism described above will be described hereinafter with reference to the flowchart of FIG. 3 showing a first embodiment of this invention.

First, signals regarding the running control state and travel state of the vehicle, the state of the internal combustion engine 1, and charge state of the battery 9 (collectively termed "vehicle state" or "vehicle condition") are received from each sensor 14 to 20 at step 100, and a charge/discharge power quantity determination subroutine which determines the electrical power with which the battery 8 is to be charged or discharged based on the signals received is executed at step 101.

Next, the invention determines whether the throttle opening angel K exceeds a specified threshold value on the basis of the signal from the throttle sensor 17 at step 102. If so, application of torque is deemed necessary and a torque application subroutine to be described later is executed at step 104. Then, processing returns to step 100. If the throttle opening angle does not exceed the threshold value, execution advances to step 106. That is to say, step 102 determines whether an operation to increase engine power is in progress, and for this purpose the depression force or depression angle of the accelerator pedal, the amount of intake air or amount of fuel flow to the internal combustion engine 1, or the like can be employed in place of the throttle opening angle as an indicator of the power increase operation.

Step 106 determines whether the depression angle of the brake pedal has exceeded a specified threshold value. If so, electrical power restoration is deemed to be necessary, and the electrical power restoration subroutine to be described later is executed at step 105. Thereafter, processing returns to step 100. If the brake pedal depression angle does not exceed the threshold value, execution returns to step 100 after performing normal electrical generation control or normal generator control at step 110.

Figure 4:
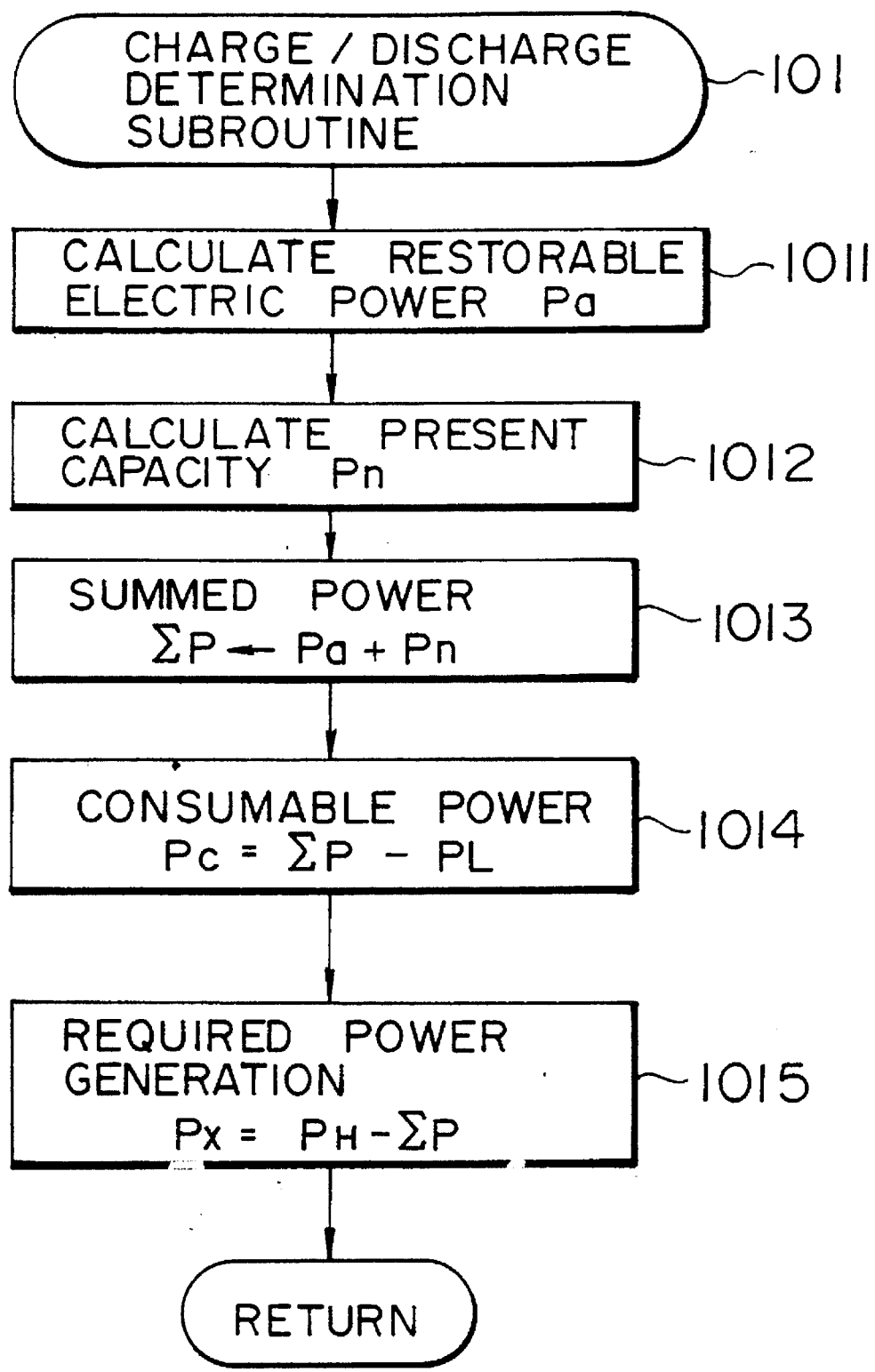
FIG. 4 is a flowchart showing in detail a charge/discharge power quantity determination subrouting of FIG. 3.

Next, the charge/discharge power quantity determination subroutine of step 101 will be described in greater detail with reference to the flowchart of FIG. 4.

First, the amount of restorable electrical power Pa, i.e., the amount of electrical power which can be restored during braking by means of generator operation of the electrical generator motor 3 until the time when the vehicle is stopped, is read from an internal map or calculated on the basis of the detected vehicle speed transmission shift position, and presence or absence of torque converter lockup at 1011, and also the present capacity Pn of the battery 8 is read from an internal map on the basis of the terminal voltage and current of the battery 8 at step 1012. The current value is searched at this time. The reason for this is that voltage drops and the like of internal electrodes of the battery 8 fluctuate according to fluctuations in the current value, and so the terminal voltage of the battery 8 due to these effects is compensated, terminal voltage at a current value of zero is determined, and the present capacity Pn of the battery 8 is determined on that basis. Moreover, because the amount of restorable electrical power Pa is proportional to the square of vehicle speed V, it is acceptable simply to make a determination such as $Pa=kV^2$ (where k is a constant of proportionality). Additionally, it is acceptable to vary k according to the shift position or the presence or absence of lockup, without making it a fixed value.

Next, the sum of the amount of restorable electrical power Pa and the present capacity Pn is determined as a total capacity $\Sigma P$ at step 1013.

Next, the amount of consumable electrical power $Pc=\Sigma P-PL$ at the time of torque application or the like is calculated at step 1014. PL is a minimum capacity value reserved in the battery 8 for the purpose of driving vehicle auxiliary devices, engine restarting, and the like.

Here, the reference capacity PH of the total capacity $\Sigma P$, which is the sum of the amount of restorable electrical power Pa and the present capacity Pn, is established in advance. Thereafter, in step 1015, the amount of electrical power Px required for charging, which is the difference between this reference capacity PH and the present total capacity $\Sigma P$, is calculated, and processing returns to the main routine. According to this embodiment the reference capacity PH is set at a value of 95% of the full-charge level of the battery 8.

Next, the torque application subroutine of step 104 will be described with reference to the flowchart of FIG. 5.

First, torque to be applied T is read from an internal map in accordance with the throttle opening angle at step 1041. According to this embodiment, the throttle opening angle (using the effective amount of accelerator depression is also acceptable) and the torque T are roughly proportional to each other, so that total drive torque smoothly tracks changes in the throttle opening angle.

Next, step 1042 determines whether the amount of consumable electrical power Pc calculated in step 1014 remains (Pc>0), and step 1042 further determines whether the present capacity Pn of the battery 8 is in excess of the minimum present capacity PnL, which is the minimum required minimum value, and only when both determinations are positive is there an advance to step 1043 with the next application of torque executed. Otherwise, it returns to the main routine.

In the subsequent step 1043, field current If is read from an internal map on the basis of the rotation speed of the electrical generator motor 3 and the amount of torque applied T which has been determined in step 1041. According to this embodiment, torque control is performed by controlling the field current If, but it may be performed by a phase control in which the switching timing of armature current is changed.

In the subsequent step 1044, field current is controlled according to the field current If determined in step 1043, and the switching of each transistor in the three phase inverter circuit 51 of the electrical power control unit 5 effects operation of the electrical generator motor 3 and the application of torque on that basis.

Figure 6:
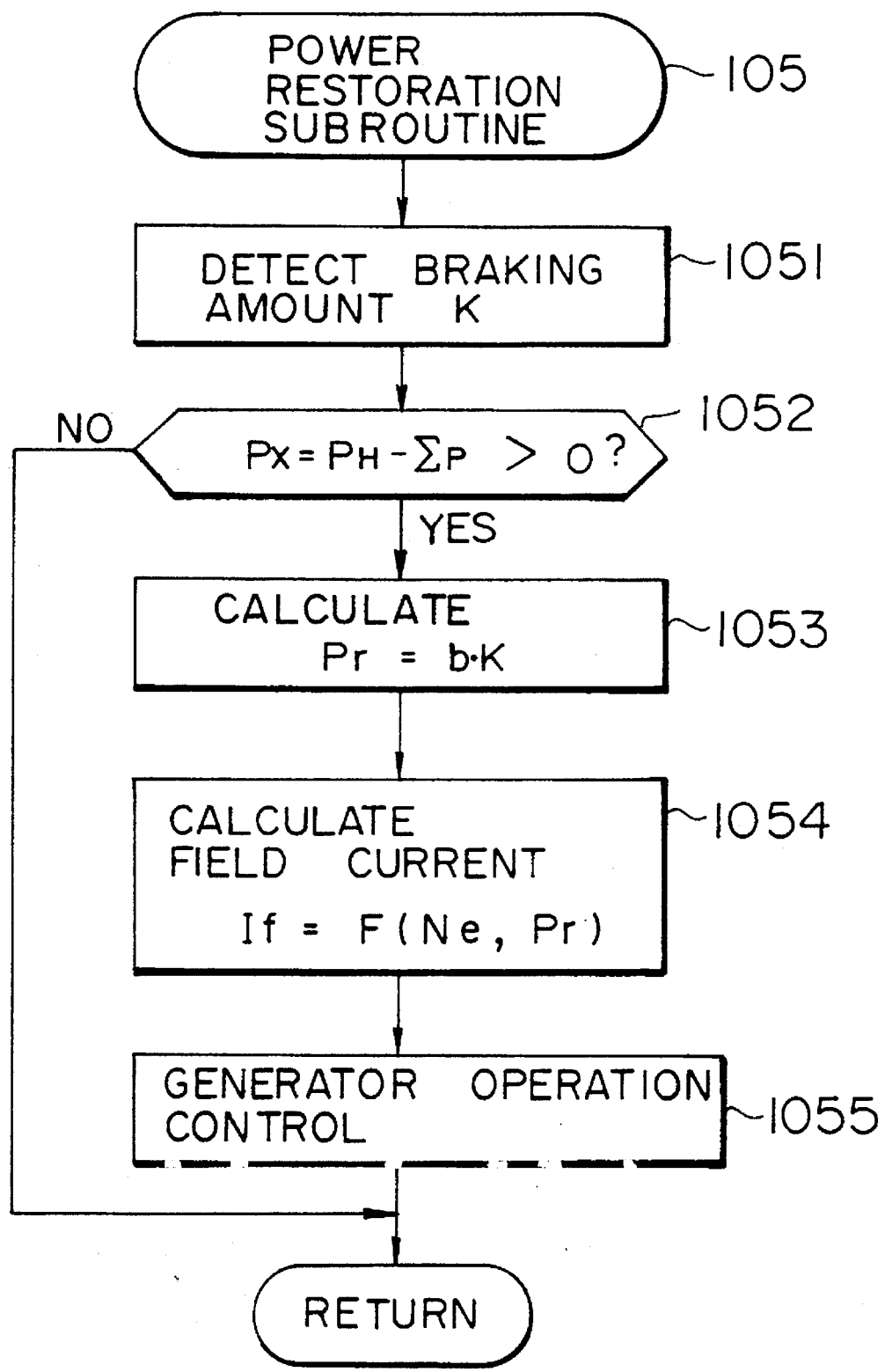
FIG. 6 is a flowchart showing in detail an electrical power restoration subroutine of FIG. 3.

Next, the electrical power restoration subroutine of step 105 will be described with reference to the flowchart of FIG. 6.

First, the effective amount of depression of the brake pedal K is detected at step 1051. Here, the effective amount of depression K is the amount of depression included in the depression range which generates the actual braking force of the brake, in contrast to the amount of depression which does not generate actual braking force of the brake where the two total to 100% of the amount of depression.

Next, step 1052 calculates whether the amount of electrical power required for charging Px calculated in step 1015 is larger than zero, i.e., whether the total capacity $\Sigma P$ is smaller than the reference amount of electrical power PH at step 1052. If not, then restoration of electrical power is not desirable, and execution returns to the main routine so that excessive charging of the battery 8 is prevented. If Px>0, then execution advances to step 1053.

In step 1053, restoration electrical power $Pr=b\cdot K$ is calculated in accordance with the effective amount of depression of the brake pedal K, with b being a constant of proportionality.

In the subsequent step 1054, the field current If is read from an internal map as a function of this restoration electrical power Pr and the engine rotational speed Ne. According to this embodiment, control of restoring electrical power is performed by controlling the field current If, but execution by means of phase-control which controls the switching timing of the armature coil application voltage or by duty ratio control for the armature current is of course also possible.

In the subsequent step 1055, the field current is controlled according to the field current If determined in step 1054, and the switching of the electrical power control unit 5, which is the three phase inverter circuit, effects generator operation of the electrical generator motor 3, and the electrical power restoration is performed in that way.

Figure 7:
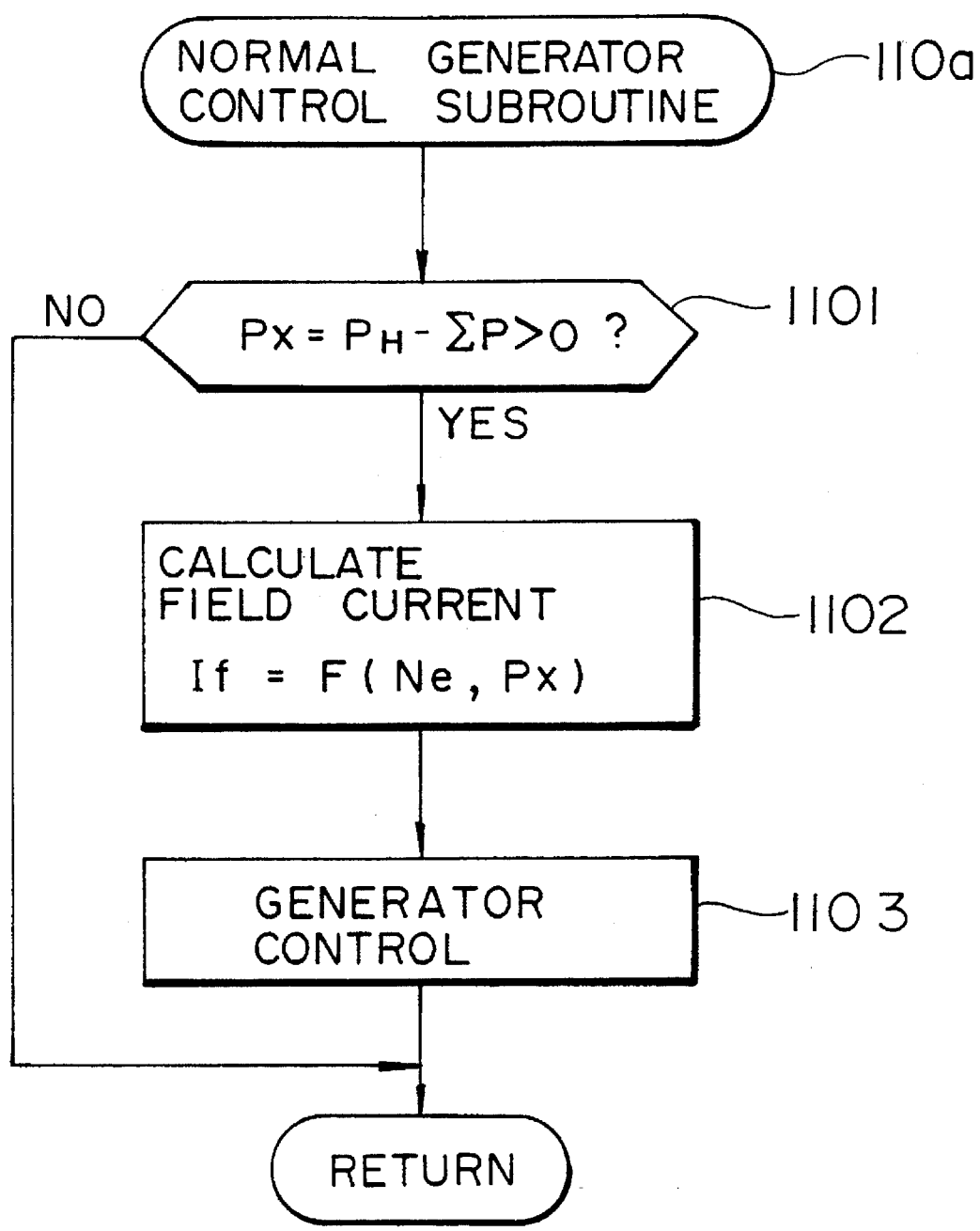
FIG. 7 is a flowchart showing in detail a normal generator control subroutine of FIG. 3.

Next, the normal electrical generator control subroutine of step 110 will be described with reference to the flowchart of FIG. 7.

First, step 1101 calculates whether the amount of electrical power required for charging Px calculated in step 1015 is larger than zero, i.e., whether the total capacity $\Sigma P$ is larger than the reference amount of electrical power PH. If not, then restoration of electrical power is determined to be unnecessary and processing returns to the main routine. Thus, excessive charging of the battery 8 is prevented. If Px>0, then execution advances to step 1102.

In step 1102, the field current If is read from an internal map on the basis of this amount of electrical power required for charging Px and the engine rotations speed Ne. According to this embodiment, control of electrical power restoration is performed by controlling the field current If; however, it may be performed by means phase control which controls switching timing of armature coil application voltage or by a duty ratio control for the armature current.

In the subsequent step 1103, the duty ratio of the field current If is controlled according to the field current If determined in step 1054, the switching of the electrical power control unit 5, which is the three phase inverter circuit, is controlled to effect generator operation of the electrical generator motor 3, and electricity generation required for normal driving of vehicle auxiliary devices and charging of the battery 8 are performed.

According to this embodiment, PH, which is the reference value for the total capacity $\Sigma P$, is set to be 95% of the full-charge capacity of the battery 8, but it is also acceptable to make this a full value, for example 100%.

Additionally, according to this embodiment, a battery 8 is employed as an electrical storage device, but a double-layer capacitor or the like is also acceptable.

Furthermore, since the storage capacity of the electrical storage device such as a battery 8, electric double-layer capacitor, or the like may deteriorate due to changes over years of time, it is possible to calculate this deterioration of electrical storage capacity by known techniques and to cause the reference value PH of the total capacity ΣP to be reduced by the calculated amount of deterioration. It is also possible to estimate deterioration of the electrical storage capacity in accordance with usage time or number of charge/discharge cycles, and to determine the reference value PH on the basis of this estimated full-charge capacity.

Still further, according to this embodiment the present capacity of the battery is determined on the basis of the terminal voltage and current of the battery 8 (or electric double-layer capacitor), but it is also possible to calculate a substantial outflow/inflow current to the battery 8 from the difference between the exchanged current of the battery 8 (or electric double-layer capacitor) and electric generator motor 3 on the one hand and the current supplied from the battery 8 and the vehicle electrical load (including vehicle auxiliary devices), and to estimate the present capacity of the battery 8 (or electrical double-layer capacitor) from an accumulation value of this substantial outflow/inflow current.

Moreover, it is possible to calculate the capacity of the battery 8 from the specific gravity of its electrolyte, and to calculate the capacity of an electric double-layer capacity by multiplying the difference between the terminal voltage V1 thereof and terminal voltage V2 at the time of final discharge by a known electrostatic capacitance C.

Figure 8:
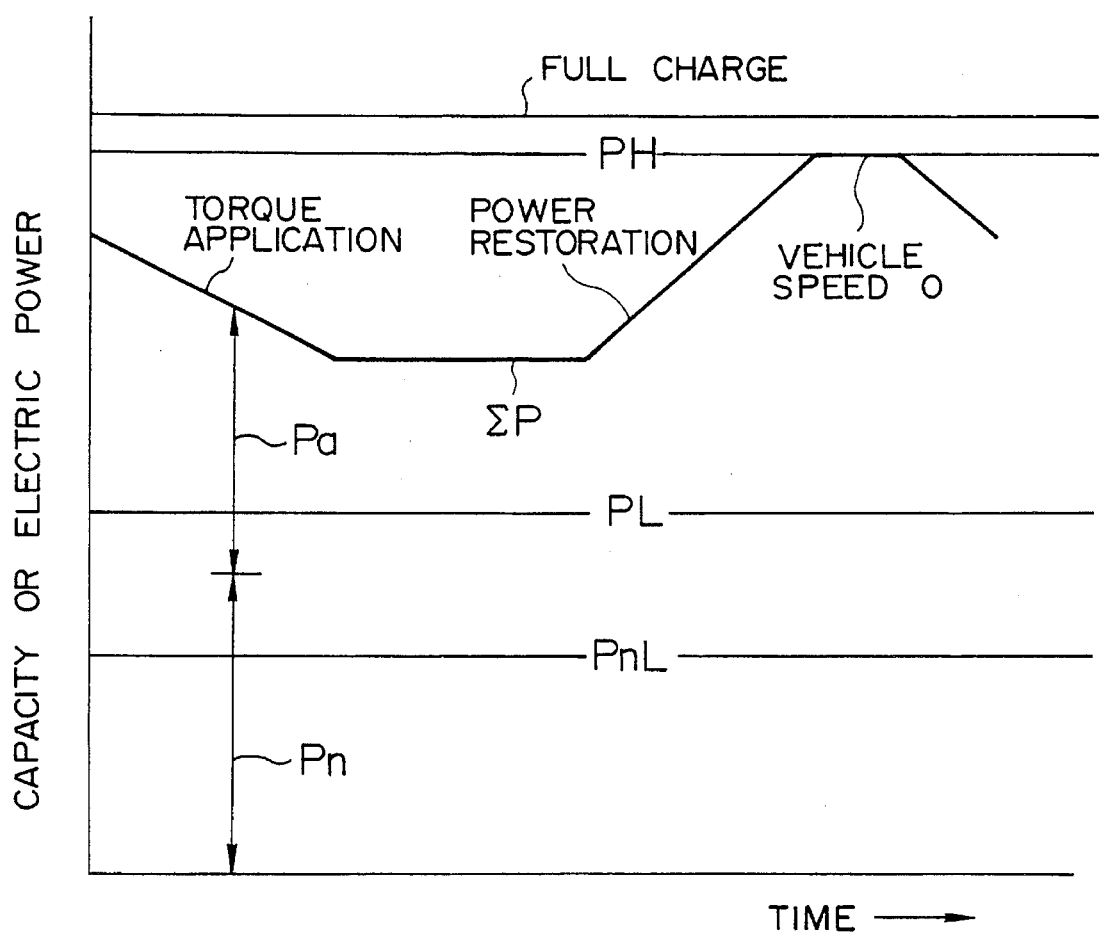
FIG. 8 is a graph showing the relationship between battery capacity and various amounts of electrical power overtime in the control operation of FIG. 3.

FIG. 8 is a flowchart showing a relationship between the various capacities and amounts of electrical power describe above, as well as changes in total capacity ΣP.

It can be understood from the foregoing description that a control mechanism according to this embodiment demonstrates the following mode of operation and effects.

First, the electrical generator operation of the electrical generator motor 3 is controlled so that the total ΣP of the amount of restorable electrical power Pa calculated on the basis of the vehicle state and the present capacity Pn of the electrical storage means are within a specified reference capacity range PH. That is to say, when restorable electrical power is at a maximum, the present capacity is made smaller. Accordingly, by using electrical power restoration or the like during vehicle braking, the application of torque and the restoration of electrical power can be accomplished while preventing excessive charging of the electrical storage device, without the capacity of the electrical storage device becoming excessive in comparison with a favorable reference capacity range PH.

Additionally, motor operation—i.e., application of torque— of the electric generator motor 3 is performed within a range where the present capacity Pn of the electrical storage device does not drop below a specified minimum present capacity PnL required for driving the engine or vehicle auxiliary, devices. Accordingly, the present capacity Pn of the electrical storage device (i.e., the amount of electrical power storage) drops due to the application of torque, thereby avoiding the possibility of insufficiently driving vehicle auxiliary devices, for example inability in driving vehicle auxiliary devices when stopping the internal combustion engine.

Furthermore, the electrical generator motor 3 is made to operate as a motor with continuously changing restored electrical power, where there is a positive correlation with the change in the effective amount of depression of the brake pedal. Accordingly, when the amount of depression is changed within the range of the effective amount of depression of the brake pedal, a smooth braking feeling can be obtained in the range of the effective amount of depression of the brake pedal, without the magnitude of restored electrical power Pr changing abruptly and thereby causing braking shock.

Figure 9:
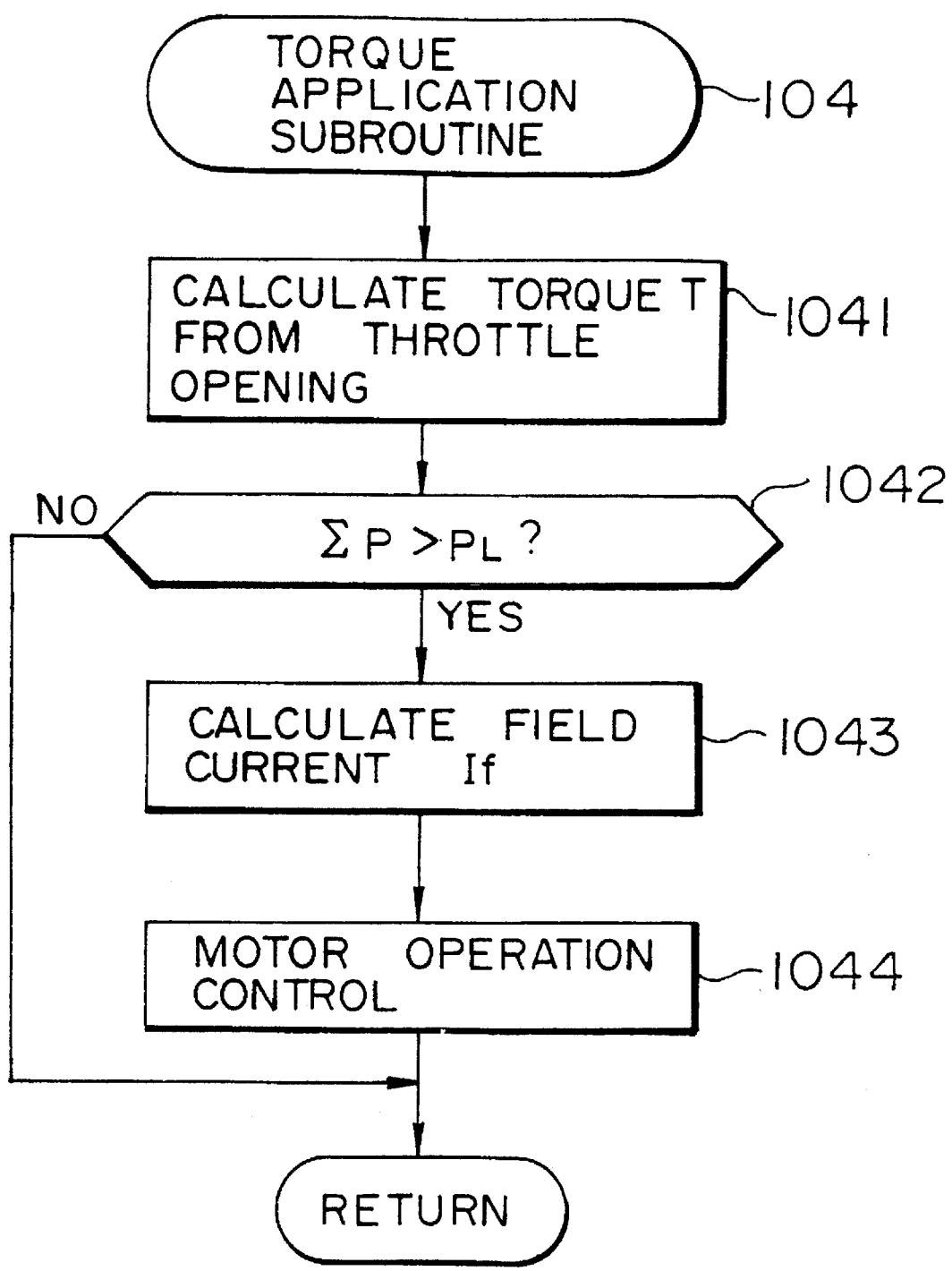
FIG. 9 is a flowchart showing in detail a torque application subroutine according to a second embodiment of the control mechanism of FIG. 1.

The second embodiment of the control mechanism according to this invention will be described with reference to FIG. 9.

According to this embodiment, in the torque application subroutine 104, steps 1043 and 1044 are executed only in the case where the total ΣP of the amount of restorable electrical power Pa calculated on the basis of the vehicle state and the present capacity Pn of the electrical storage device is lager than the specified minimum capacity value PL. This torque application subroutine is not executed when ΣP is not more than the specified minimum capacity value PL.

Additionally, it is possible to make the specified minimum capacity value PL equal to or smaller than the reference capacity PH. According to this embodiment, PL is set at 90% of PH.

For example, if the accelerator is depressed and the degree of throttle opening increased, the vehicle accelerates due to increased output of the internal combustion engine 1. Electrical power is supplied to the electrical generator motor 3 to apply torque to the extent of the amount of increased in restorable electrical power Pa due to this acceleration and PL–PH, the amount of restorable electrical power Pa, increases further by means of the increase in acceleration, and an amount of electrical power equal to this is further consumed by the application of torque.

The third embodiment will be described with reference to FIG. 10 through FIG. 14.

This embodiment includes a modification of the charge/discharge power quantity determination subroutine of step 101, the torque application subroutine of step 104, the electrical power restoration subroutine of step 105, and the normal electrical generator control subroutine of step 110 in the control operation of the first embodiment. That is to say, whereas the first embodiment compares ΣP with PH or PL and executes steps 1043 and 1044, or 1053, 1054 and 1055, or 1102 and 1103, according to the present embodiment Pn is compared with Pna or PLL.

Figure 10:
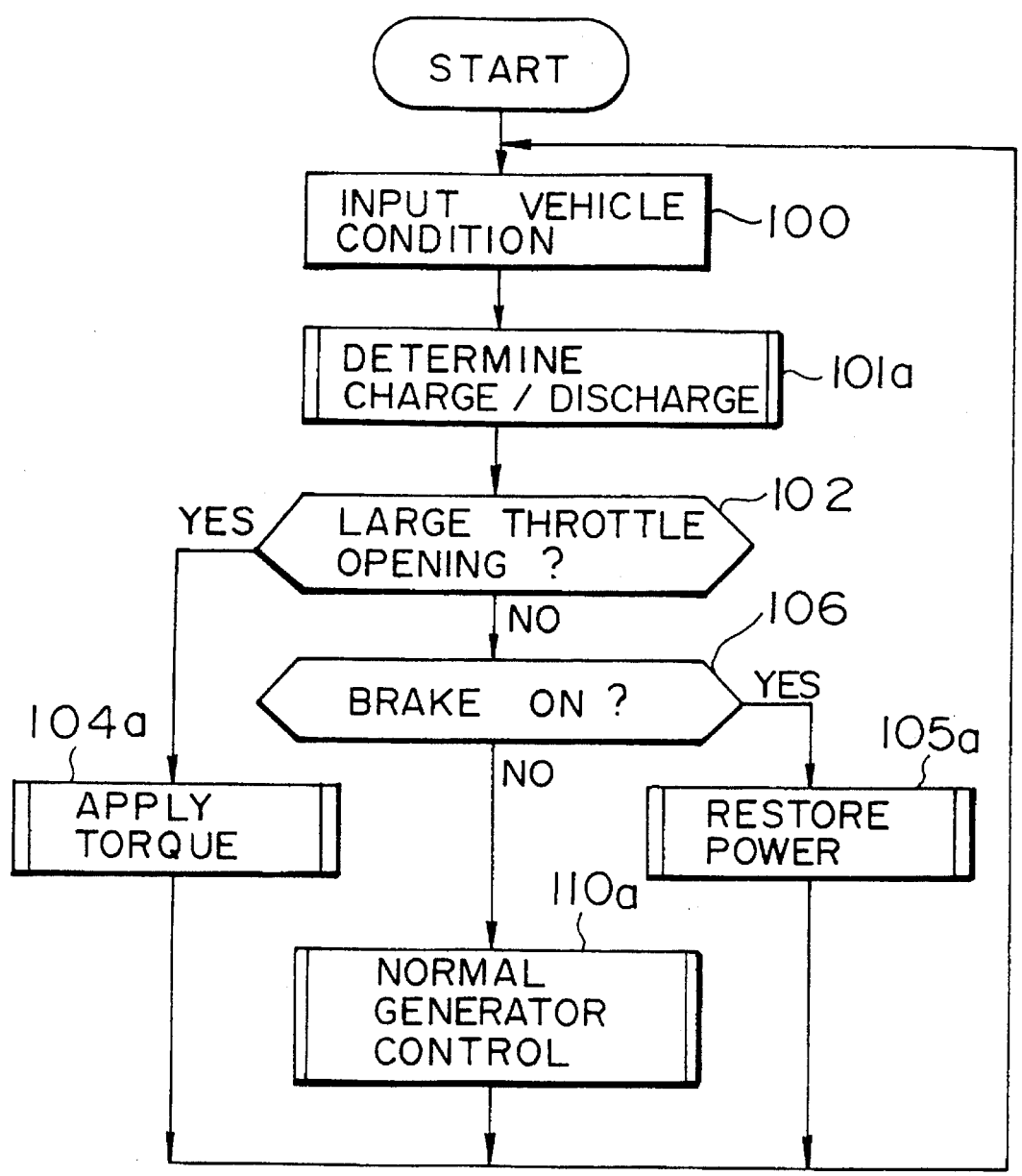
FIG. 10 is a flowchart showing an overall control operation according to a third embodiment of the control mechanism of FIG. 1.

Of the operation of this embodiment, the respective subroutines of steps 101*a*, 104*a*, 105*a* and 110*a* of FIG. 10 will be described hereinafter.

The charge/discharge power quantity determination subroutine of step 101*a* will be described first with reference to the flowchart of FIG. 11.

Figure 18:
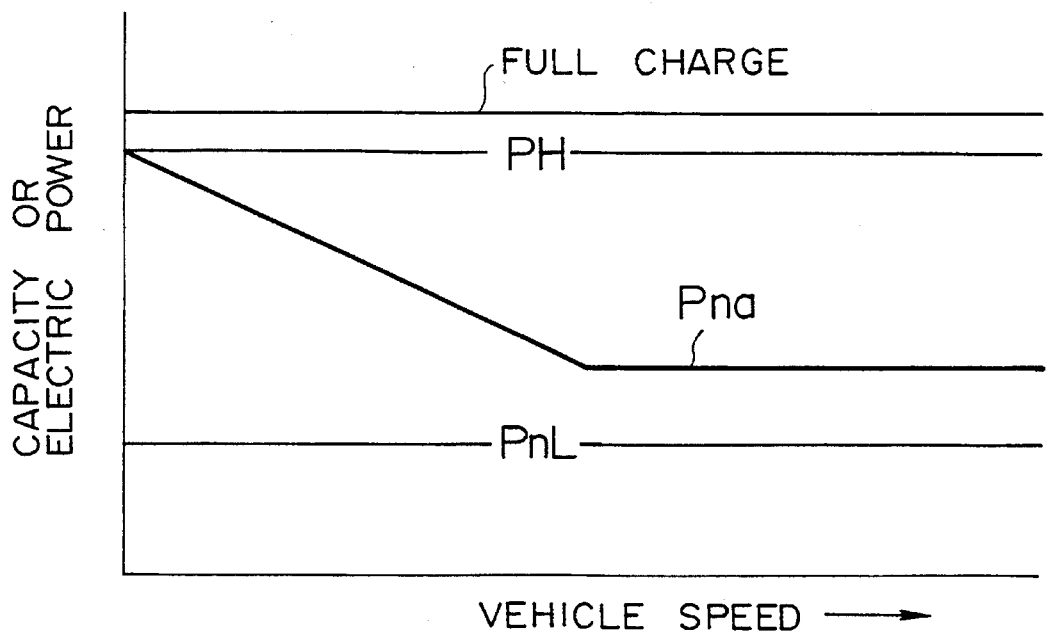
FIG. 18 is a graph showing a map which determines a target present battery capacity based on detected vehicle speed according to the third embodiment of the present invention.

First, a target present capacity Pna is read at step 1011*a* from the detected vehicle speed using an internal map shown in FIG. 18, and the present capacity Pn of the battery is read from an internal map on the basis of the terminal voltage and current of the battery 8 at step 1012.

Next, the amount of consumable electrical power Pc=Pn–PnL at the time the torque application or the like is calculated at step 1014*a*. PnL is a minimum present capacity to remain in the battery 8 for the purpose of driving vehicle auxiliary electrical devices, engine restarting, and the like.

Next, the amount of electrical power required for charging PY, which is the difference between Pna (which is the target value for Pn) and the present capacity Pn, is calculated at step 1015*a*, and processing returns to the main routine.

Figure 12:
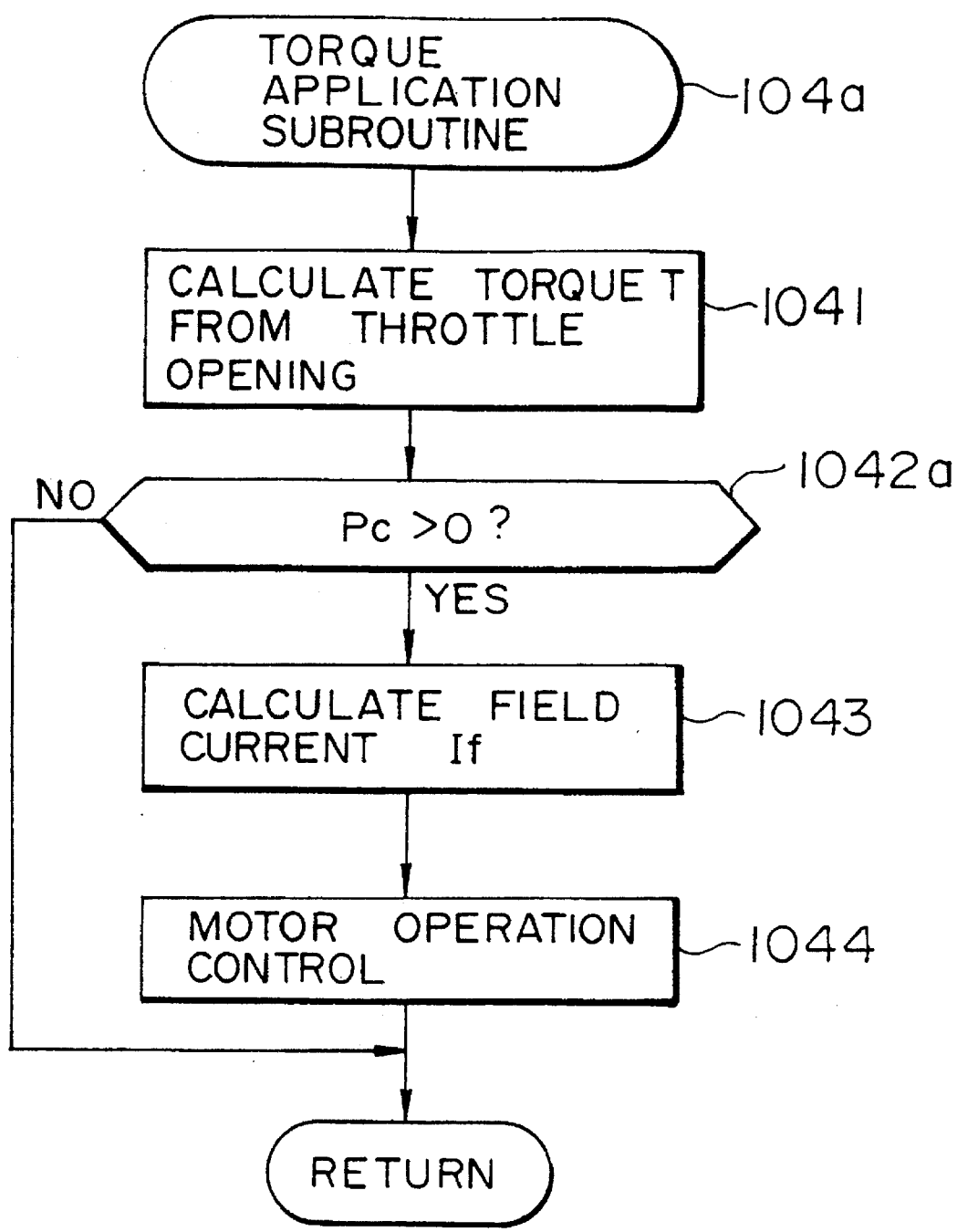
FIG. 12 is a flowchart showing in detail a torque application subroutine of FIG. 10.

Next, the torque application subroutine of step 104*a* will be described with reference to the flowchart of FIG. 12.

Figure 5:
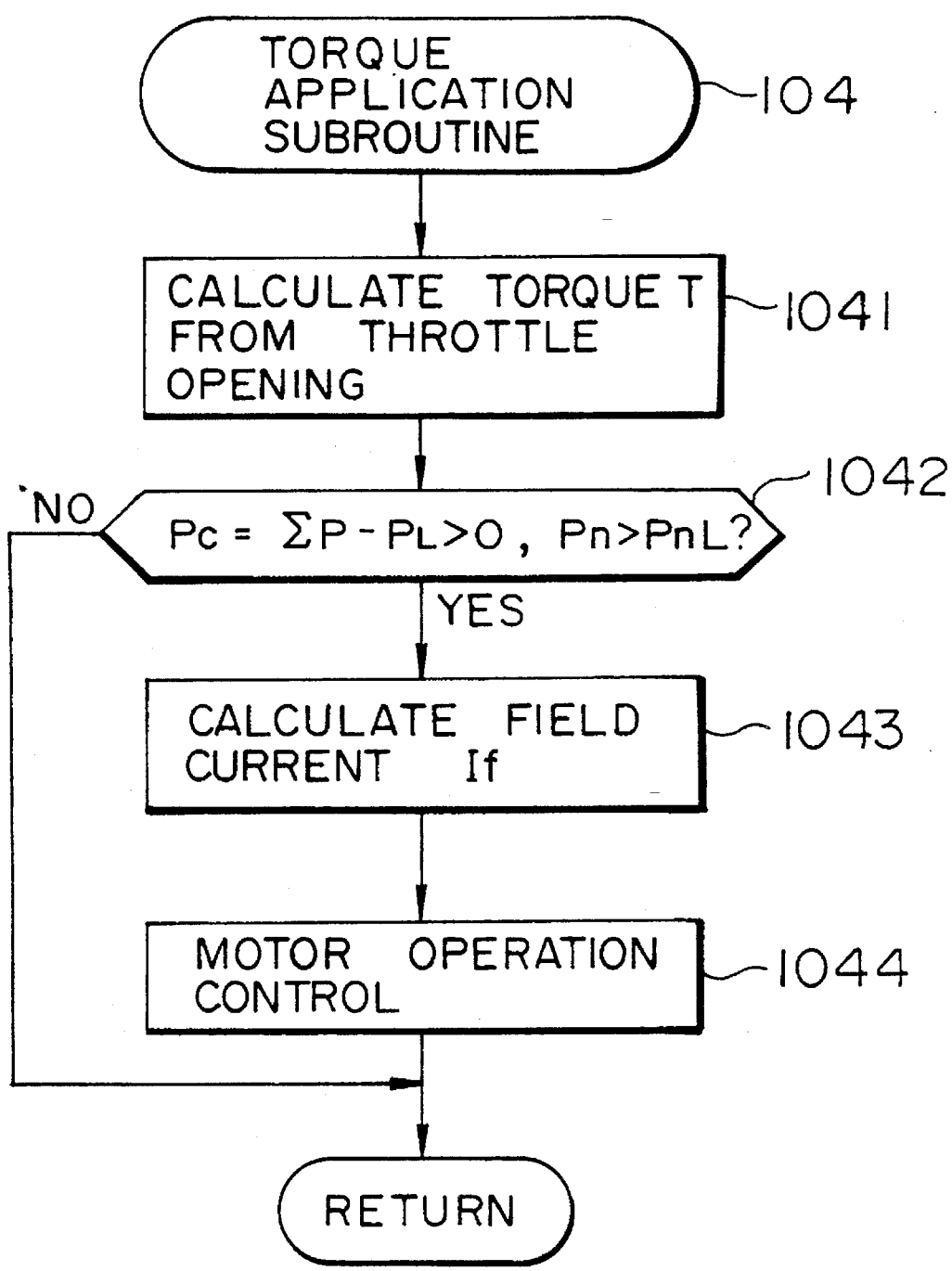
FIG. 5 is a flowchart showing in detail a torque application subroutine of FIG. 3.

First, when the subroutine is entered at step 104*a*, torque to be applied T is read from the internal map similar to the manner of step 1041 (FIG. 5).

Next, step 1042a determines whether the amount of consumable electrical power Pc calculated in step 1014a remains, and only when the result is affirmative is there an advance to step 1043 with the next application of torque executed by the steps 1043 and 1044. Otherwise, processing returns to step 1042a.

Figure 13:
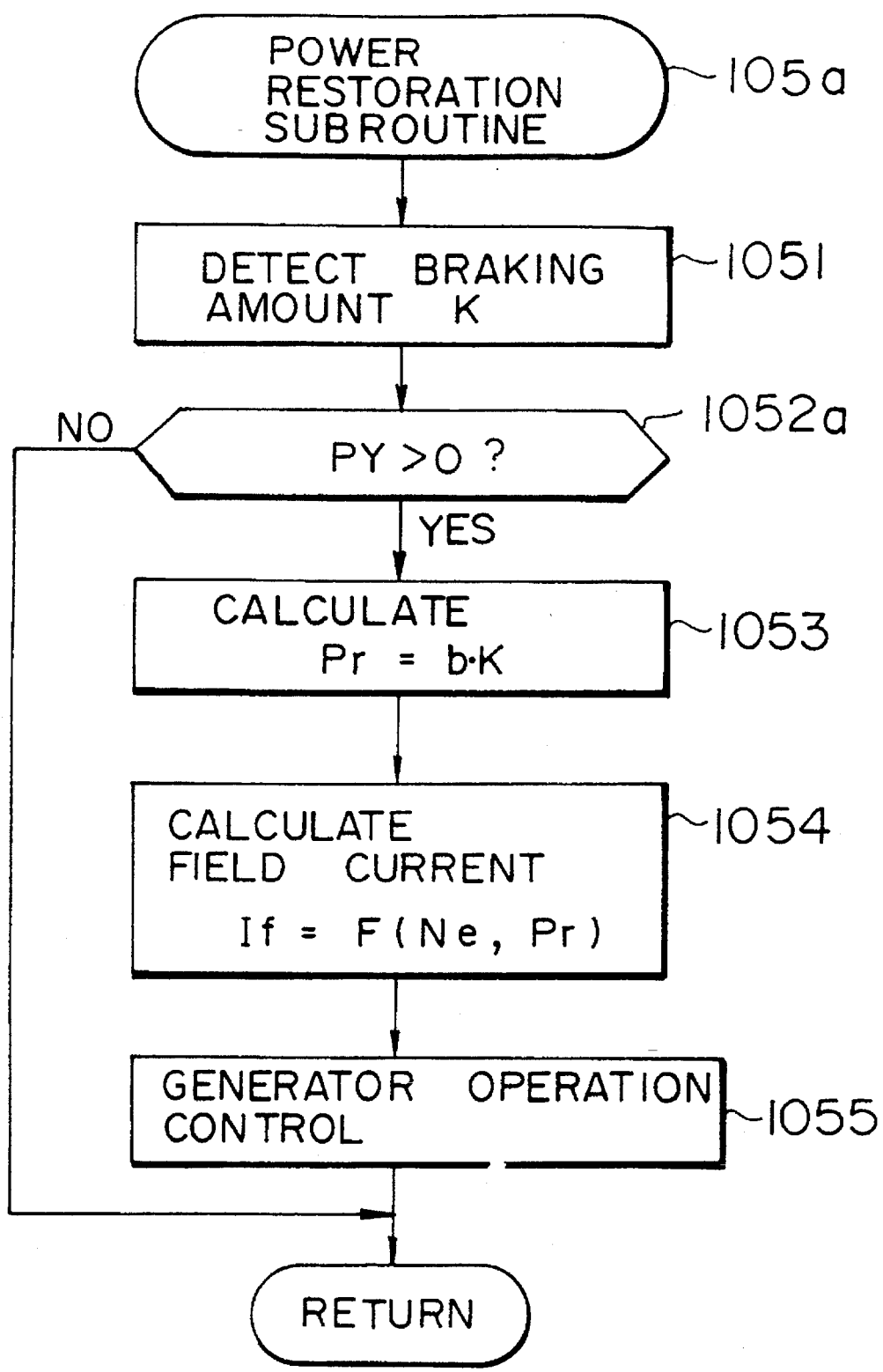
FIG. 13 is a flowchart showing in detail an electrical power restoration subroutine of FIG. 10.

Next, the electrical power restoration subroutine of steps 105a a will be described with reference to the flowchart of FIG. 13.

First, when the subroutine is entered at step 105a, the amount of depression of the brake pedal K is detected at step 1051 similarly to the first embodiment.

Next, the invention determines whether the amount of electrical power PY required for electrical generation calculated in step 1015a is larger than zero, i.e., whether Pn is smaller than Pna at step 1052a. If not, then restoration of electrical power is not desirable, and so the processing returns to the main routine and excessively charging of the battery 8 is prevented. Otherwise, execution advances to step 1053.

The operation in each of steps 1053, 1054 and 1055 is similar to corresponding parts of the first embodiment.

Figure 14:
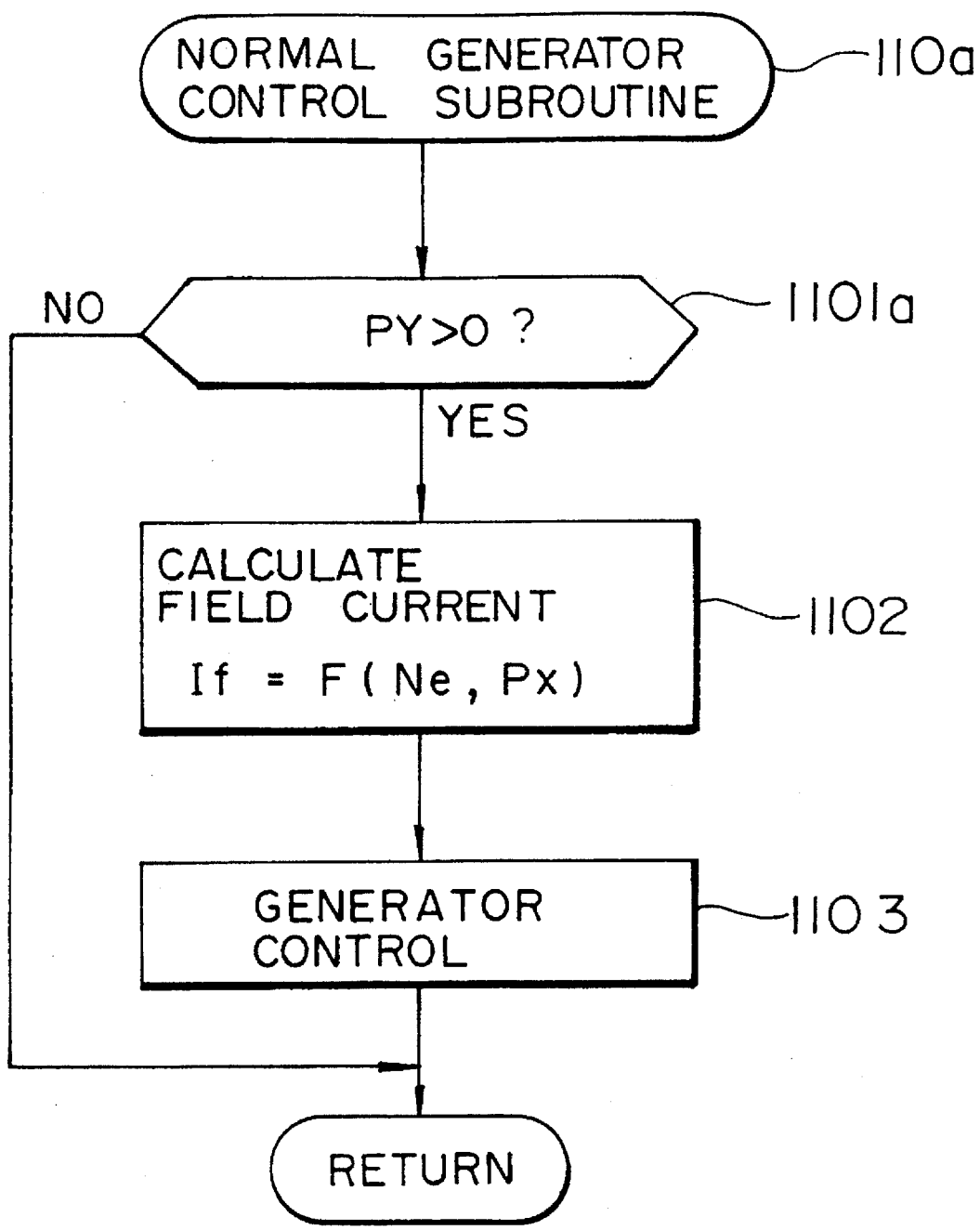
FIG. 14 is a flowchart showing a normal generator control subroutine of FIG. 10.

Next, the normal electrical generator control subroutine of step 110a will be described with reference to the flowchart of FIG. 14.

Figure 11:
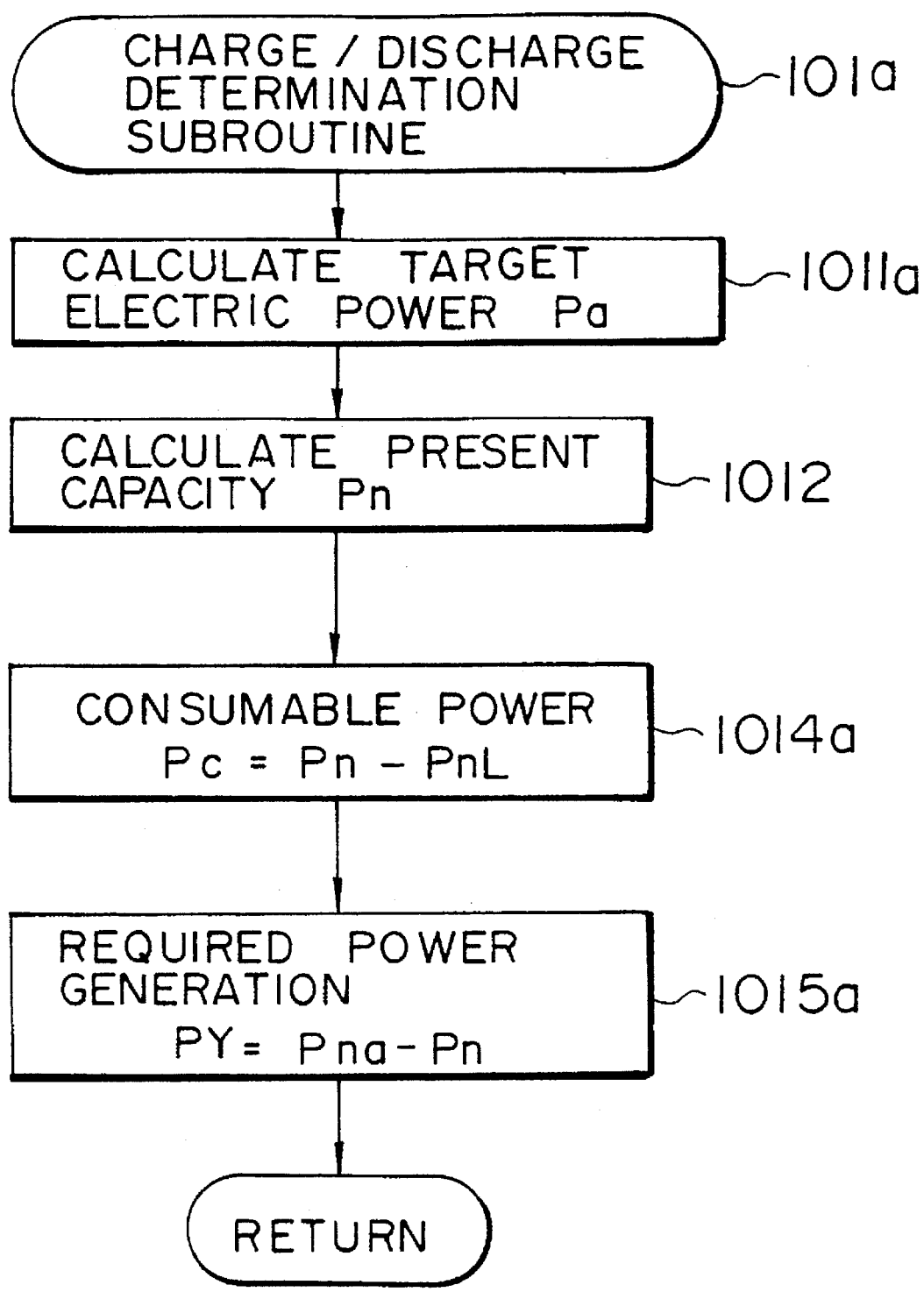
FIG. 11 is a flowchart showing in detail a charge/discharge power quantity determination subroutine of FIG. 10.

First, when this subroutine is entered from step 110a, it calculates whether the amount of electrical power required for charging PY calculated in step 1015a of FIG. 11 is larger than zero, i.e., whether Pn is smaller than Pna. If not, then electrical generator operation is unnecessary, execution returns to the main routine, and excessive charging of the battery 8 is prevented. Otherwise, then there is an advance to step 1102.

The operation in each of steps 1102 and 1103 is similar to corresponding parts of the first embodiment.

Figure 17:
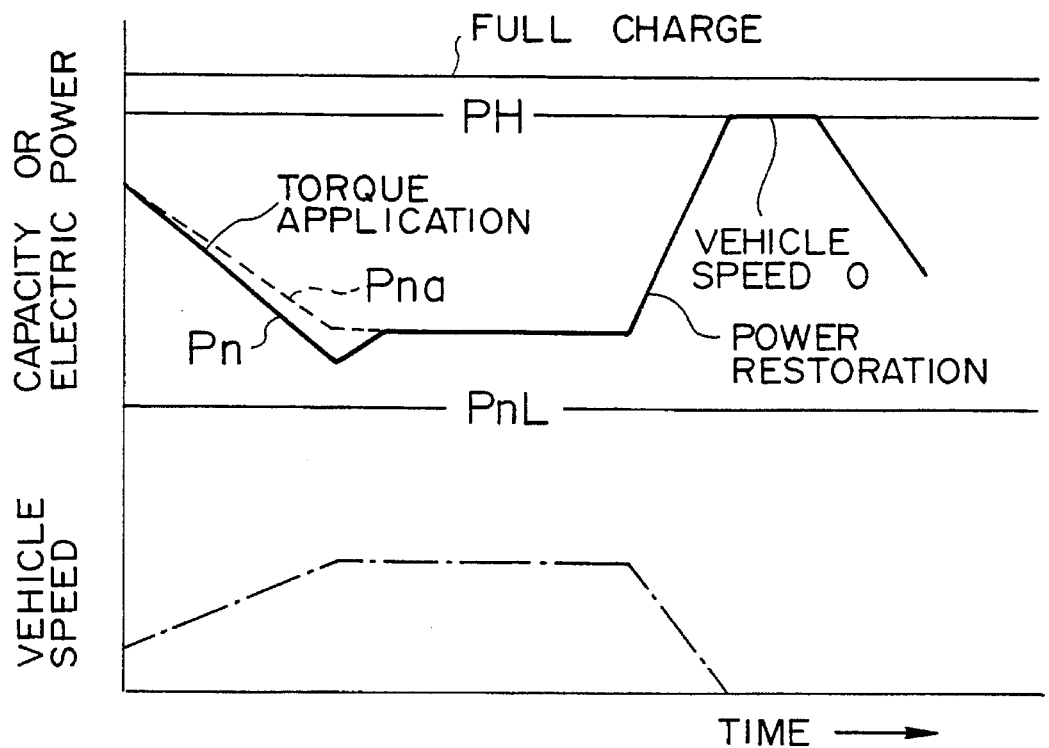
FIG. 17 is a graph showing a relationship between battery capacity and various amounts of electrical power over time in a control operation of the third embodiment.

It will be understood that, according to the embodiment of FIG. 10 through FIG. 14, the control mechanism will operate as shown in FIG. 17.

In the foregoing respective embodiments according to this invention, the amount of restorable electrical power is determined from the vehicle speed, but it is acceptable if this is determined based on information related to vehicle speed, and is not exclusively limited to direct determination from only the vehicle speed signal.

For information related to vehicle speed, it is acceptable if a signal that can detect an increase in kinetic energy of the vehicle when vehicle speed increases is used. For example, the average value of the engine rotational speed, turbine rotational speed within the torque converter of the automatic transmission, wheel speed, wind speed, wind pressure, gear ratio, or an integral value of vehicle longitudinal acceleration can be employed.

Figure 15:
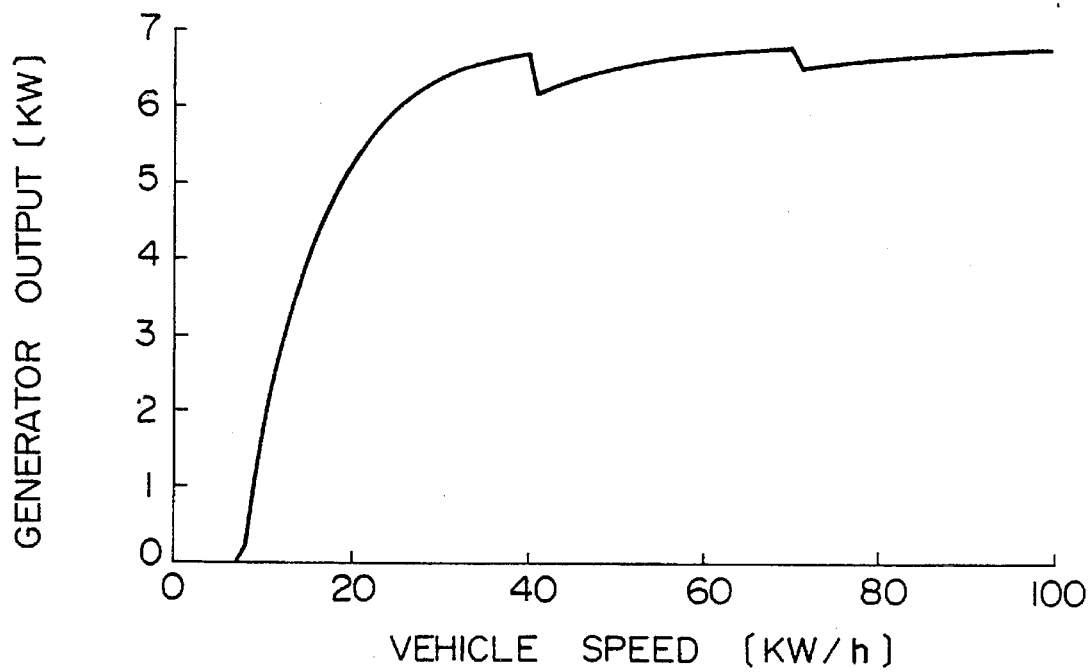
FIG. 15 is a graph showing the relationship between vehicle speed and generator output.
Figure 16:
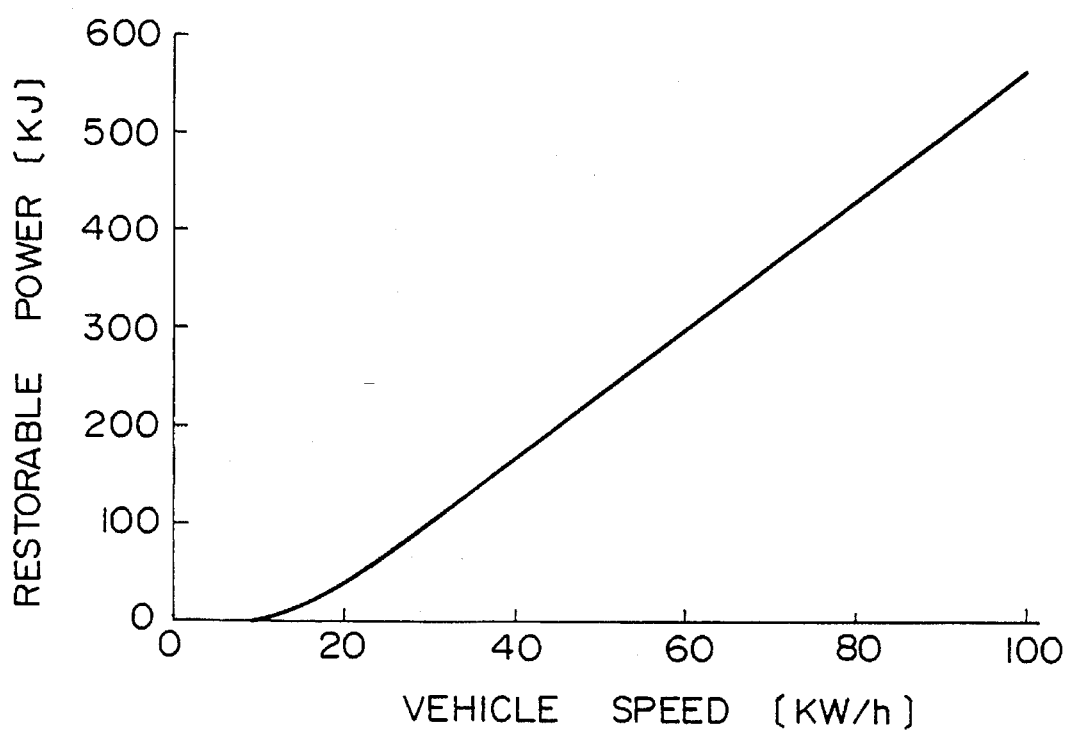
FIG. 16 is a graph showing the relationship between vehicle speed and restorable power.

Furthermore, because the amount of restorable electrical power Pa is proportional to the square of the vehicle speed V as a simple approximation, it has previously been stated that it is acceptable simply to make a determination such as $Pa = kV^2$ (k is a constant of proportionality), but in order to increase accuracy, it is also possible to determine the amount of restorable electrical power with a map such as the one shown in FIG. 16. A description of this process will now be made with reference to FIG. 15 and FIG. 16.

First, FIG. 15 shows the electrical generator output which can be calculated in advance by means of the vehicle speed determined by engine rotational speed and shift position when lockup occurs. FIG. 16 is an example wherein standard deceleration is assumed with respect to the electrical generator output of FIG. 15, deceleration period from the respective vehicle speeds to a vehicle speed of zero are calculated, and then electrical generator output is integrated during the deceleration period to obtain the amount of restorable electrical power. According to this example, standard deceleration is made to be fixed at any vehicle speed, but it is also acceptable to weight deceleration at the respective vehicle speeds according to the characteristics of the vehicle, modify the integration time period, and thereby make a map with enhanced precision. Additionally, in consideration of cases of a change in shift-down patterns due to differences in shift range (D, L, S) or the like, or in shift pattern mode switches (power mode, economy mode), or the like in an electronically controlled automatic transmission, it is possible to implement shift range information and shift pattern mode information and prepare a plurality of maps. Furthermore, in a non-lockup state, the rotational speed determined using vehicle speed and shift position differs from that of FIG. 16, and so it is acceptable to prepare a separate map for the amount of restorable electrical power corresponding thereto.

The present invention having been described with reference to the presently preferred embodiments shall not be restricted thereto but may be modified in various ways without departing from the concept of this invention.

What is claimed is:

1. A controller for a vehicle motor .generator which functions as an electric motor and as an electric generator charging an electrical storage device, said controller comprising:

travel energy detection means for detecting a vehicle speed during vehicle travel;

present capacity determining means for determining a present capacity remaining in said electrical storage device; and control means for selectively operating said motor generator as an electric generator and as an electric motor based on said detected vehicle speed and said determined present capacity;

wherein said control means is further for calculating an amount of electric power required by said electrical storage device, and for operating said motor generator as an electric generator based on said calculated amount.

2. A controller according to claim 1, wherein said control means is further for calculating a sum of an amount of restorable electrical power which said motor generator will restore to said electrical storage device and said present capacity, for comparing said sum to a reference value, and for controlling operation of said motor generator based on said comparison.

3. A controller for vehicle electric generator motor operating as a generator to supply electric power to an electrical storage device during at least vehicle braking and operating as a motor to apply torque to an internal combustion engine responsive to a torque application instruction, said controller comprising:

vehicle state detection means for detecting a vehicle state including a vehicle speed;

capacity detection means for detecting a present capacity of said electrical storage device;

restorable electrical power quantity calculation means for calculating an amount of electrical power restorable to said electrical storage device based on said vehicle state; and first control means for selectively operating said electric generator motor as an electric generator when a sum of said restorable electrical power and said present capacity is smaller than a specified reference capacity, said specified reference capacity being less than a full-charge capacity of said electrical storage device.

4. A controller according to claim 3, further comprising:

second control means for selectively operating said electric generator motor as a motor operation to apply torque to said internal combustion engine by applying electrical power to said generator motor within a range in which said present capacity of said electrical storage device is above a specified minimum present capacity.

5. A controller according to claim 3, further comprising:

depression quantity detection means for detecting an effective mount of depression of a brake pedal of said vehicle;

wherein said restorable electric power quantity calculation means is further for calculating said restorable electrical power so that said restorable electric power continuously changes in a manner having a positive correlation with a change in said effective amount of brake depression, and for causing said electric generator motor to operate as a generator.

6. A controller for an electric generator motor in an internal combustion engine, said controller operating said generator motor as a generator to supply electric power to an electrical storage device during vehicle braking and operating said generator motor as a motor to apply torque to an internal combustion engine in response to a torque application instruction, said controller comprising:

vehicle state detection means for detecting a vehicle state including a vehicle speed;

capacity detection means for detecting a present capacity of said electrical storage device;

restorable electrical power quantity calculation means for calculating an amount of electrical power restorable to said electrical storage device based on said vehicle state; and control means for operating said motor generator as a motor to apply torque to said internal combustion engine when a total of said calculated amount of restorable electrical power and said present capacity is larger than a specified minimum capacity value.

7. A control mechanism according to claim 6, wherein said control means is further for operating said motor generator as a motor when said present capacity is larger than said minimum value.

* * * * *